(12) United States Patent
Kim

(10) Patent No.: US 8,379,244 B2
(45) Date of Patent: Feb. 19, 2013

(54) NETWORK PRINTING SYSTEM, NETWORK COMMUNICATION METHOD TO PRINT INFORMATION, AND HOST AND IMAGE FORMING DEVICE TO PERFORM NETWORK COMMUNICATIONS

(75) Inventor: Woo-chang Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1005 days.

(21) Appl. No.: 11/965,128

(22) Filed: Dec. 27, 2007

(65) Prior Publication Data
US 2008/0158594 A1 Jul. 3, 2008

(30) Foreign Application Priority Data
Dec. 29, 2006 (KR) ........................ 10-2006-0137848

(51) Int. Cl.
G06F 3/12 (2006.01)
G06F 15/16 (2006.01)
G06F 15/167 (2006.01)
G06F 15/173 (2006.01)
G06K 15/00 (2006.01)
H04M 11/00 (2006.01)

(52) U.S. Cl. ...... 358/1.15; 358/1.14; 709/206; 709/219; 709/239; 379/93.24

(58) Field of Classification Search ................. 358/1.15, 358/1.14; 709/219, 206; 379/93.24; 400/70
See application file for complete search history.

(56) References Cited

U.S. PATENT DOCUMENTS

| | | | | |
|---|---|---|---|---|
| 6,431,772 B1* | 8/2002 | Melo et al. | ...................... | 400/70 |
| 6,625,642 B1* | 9/2003 | Naylor et al. | ................. | 709/206 |
| 6,801,935 B2* | 10/2004 | Shen | ............................ | 709/219 |
| 6,987,580 B2* | 1/2006 | Watanabe et al. | ............ | 358/1.15 |
| 7,110,132 B2* | 9/2006 | Takayanagi | ................. | 358/1.15 |
| 7,216,043 B2* | 5/2007 | Ransom et al. | ................. | 702/62 |
| 7,375,835 B1* | 5/2008 | Hull et al. | .................... | 358/1.15 |
| 7,576,884 B2* | 8/2009 | Kitahara et al. | ............. | 358/1.16 |
| 7,610,346 B2* | 10/2009 | Otake | ......................... | 709/206 |
| 7,788,318 B2* | 8/2010 | Kinoshita et al. | ............. | 709/203 |
| 2002/0075506 A1* | 6/2002 | Stevenson et al. | ........... | 358/1.15 |
| 2003/0053112 A1* | 3/2003 | Motosugi et al. | ............ | 358/1.14 |
| 2004/0004736 A1* | 1/2004 | Ogura et al. | ................. | 358/1.15 |
| 2004/0008373 A1* | 1/2004 | Yamamoto | .................. | 358/1.15 |

FOREIGN PATENT DOCUMENTS

| | | |
|---|---|---|
| JP | 2002-361984 | 12/2002 |
| JP | 2003-46690 | 2/2003 |
| JP | 2003-532186 | 10/2003 |

OTHER PUBLICATIONS

Korea Office Action dated Nov. 29, 2012 issued in KR 2006-0137848.

* cited by examiner

*Primary Examiner* — Akwasi M Sarpong
(74) *Attorney, Agent, or Firm* — Stanzione & Kim, LLP (57) ABSTRACT

A network printing system, a network communication method to print information, and a host and an image forming device to perform network communications are provided. A mail server provides a mail transmitting/receiving service, a host transmits a mail including channel information established for data communications, and an image forming device accesses a mail account allocated to the mail server to receive the transmitted mail, and communicate the host by using the channel information included in the received mail.

20 Claims, 7 Drawing Sheets

NETWORK PRINTING SYSTEM, NETWORK COMMUNICATION METHOD TO PRINT INFORMATION, AND HOST AND IMAGE FORMING DEVICE TO PERFORM NETWORK COMMUNICATIONS

CROSS-REFERENCE TO RELATED APPLICATIONS

This application claims priority under 35 U.S.C. §119 from Korean Patent Application No. 2006-137848, filed Dec. 29, 2006, the contents of which are incorporated herein by reference in its entirety.

BACKGROUND OF THE INVENTION

1. Field of the Invention

The present general inventive concept relates to a network printing system, a network communication method to print information, and a host and an image forming device to perform network communications. More particularly, the present general inventive concept relates to a network printing system, a network communication method to print information, a host and an image forming device to perform network communications, whereby a host located in a public network can use an image forming device located in a private network having a firewall disposed therein.

2. Description of the Related Art

A network printing system is a system in which plural user terminals share one or more image forming devices through a private network, and users request operations related to image forming to the image forming devices. Such a network printing system intercepts access of an external host by using the firewall, if the access is attempted from the external host through a public network.

The firewall is equipment for protecting the image forming device connected to the network from an external invasion. The firewall permits access from inside to outside through the private network and the public network, but intercepts access by the external host from an outside to an inside through the public network. However, if the access by the external host is set to be permissible by a network manager, the firewall releases the intercept of the access by the external host and permits the access.

Accordingly, if a user intends to print a document stored in the external host by using the image forming device located in the private network in a state that the firewall is not set to permit access by the external host, the external host cannot transmit data of the document to the image forming device. That is, in the conventional network printing system, the user cannot transmit the document stored in the external host to the image forming device in the private network due to the firewall, and thus cannot have the image forming device print the document.

SUMMARY OF THE INVENTION

The present general inventive concept provides a network printing system, a network communication method to print information, a host and an image forming device capable of performing network communications, whereby a host located in a public network can use an image forming device located in a private network having a firewall disposed therein, without a network manager's intervention.

Additional aspects and utilities of the present general inventive concept will be set forth in part in the description which follows and, in part, will be obvious from the description, or may be learned by practice of the general inventive concept.

The foregoing and other aspects and utilities of the present general inventive concept may be achieved by providing a network printing system including a mail server to provide a mail transmitting/receiving service, a host to transmit to the mail server a mail including channel information corresponding to a channel established for data communications, and an image forming device to access a mail account allocated to the mail server to receive the transmitted mail and communicate the host by using the channel information included in the received mail.

The host may include a user interface unit to receive an input of the mail account to transmit the mail and receive an input of the channel information of the host, a mail preparing unit to prepare the mail by using the input mail information and the channel information; and a communication interface unit to transmit the prepared mail to the mail server.

The host may further include a security code in the mail and transmit the mail with the security code to the mail server.

The image forming device may include a user manipulation unit to receive an input of an address of the mail server required to receive the mail, a communication unit to access the mail server by using the input address, a mail analysis unit to confirm a channel established to provide access to the host, included in the mail if the mail exists in the mail account of the accessed mail server, a control unit to control the communication unit to receive print data by accessing the host through the confirmed channel, and a print engine unit to print the print data received through the communication unit.

The network printing system may further include a storage unit to store a security code of a predetermined form, wherein if the security code of the predetermine form exists in the mail, the mail analysis unit confirms whether the security code existing in the mail coincides with the security code stored in the storage unit, and if the security code existing in the mail coincides with the security code stored in the storage unit, confirming the channel information by analyzing the mail.

The image forming device may include a communication unit to receive the print data from the host by using the channel confirmed through the channel information, a mail analysis unit to confirm whether a security code exists in the received print data, and if the security code exists, confirming whether the security code existing in the print data coincides with a security code stored in the image forming device, and a print engine unit to print the print data if the security code existing in the print data coincides with the security code stored in the image forming device.

The channel information may include an Internet protocol (IP) address and a communication port, and the image forming device is allocated with the mail account from the mail server that uses a post office protocol3/simple mail transfer protocol (POP3/SMTP).

The host may be located in a public network that is an external network, and the image forming device is located in a private network that is an internal network including a firewall.

The foregoing and/or other aspects and utilities of the general inventive concept may also be achieved by providing a network communication method to print information, which includes transmitting by a host a mail including channel information corresponding to a channel established for data communications, to a mail server allocated with a mail account of an image forming device, receiving the mail transmitted to the mail account and communicating the host by using the channel information included in the received mail by the image forming device, transmitting print data to the image forming device by using the channel corresponding to the channel information included in the mail by the host; and printing the transmitted print data by the image forming device.

The transmitting of the mail may include receiving an input of the mail account to transmit the mail and the channel information of the host, preparing the mail by using the input mail account and the channel information and transmitting the prepared mail to the mail server that corresponds to the input mail account.

The accessing of the host may include inputting an address of the mail server required to receive the mail, accessing the mail server by using the input address, confirming a channel established to provide access to the host, included in the mail if the mail exists in the mail account of the accessed mail server and accessing the host through the confirmed channel.

The confirming of the mail may include confirming whether a security code exists in the mail if the mail exists in the mail account, confirming whether a security code stored in the image forming device coincides with the security code existing in the mail if the security code exists in the mail and confirming the channel by analyzing the mail if the security codes coincide with each other.

The confirming of the mail may further include deleting the mail stored in the mail server if the security codes coincide with each other.

The printing of the print data may include receiving the print data from the host through the channel, confirming whether a security code exists in the received print data, and if the security code exists in the print data, printing the print data where the security code existing in the print data coincides with a security code stored in the image forming device.

The foregoing and/or other aspects and utilities of the general inventive concept may also be achieved by providing a host to perform network communications, which includes a user interface unit to receive an input of channel information corresponding to a channel established for the data communications and a mail account of an image forming device allocated to a mail server, a mail preparing unit to prepare the mail by using the input mail account and the channel information, and a communication interface unit to transmit the prepared mail to the mail server that corresponds to the input mail account, and transmit the print data to the image forming device if the channel with the image forming device is formed.

The image forming device may access the mail account allocated to the mail server to confirm the transmitted mail, access the host through the channel included in the confirmed mail, receive and print the print data from the accessed host.

The foregoing and/or other aspects and utilities of the general inventive concept may also be achieved by providing an image forming device to perform network communications, the host includes a user manipulation unit to receive an input of an address of a mail server required to confirm a mail transmitted from a host to the mail server, a communication unit to access the mail server by using the input address, a mail analysis unit to confirm a channel, established to provide access to the host, included in the mail if the mail exists in a mail account of the accessed mail server, a control unit to control the communication unit to receive print data by accessing the host through the confirmed channel and a print engine unit to print the print data received through the communication unit.

The host may prepare and transmit the mail that includes the channel to the mail server that provides a mail transmitting/receiving service, and transmit the print data to the host if the channel with the host is formed.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
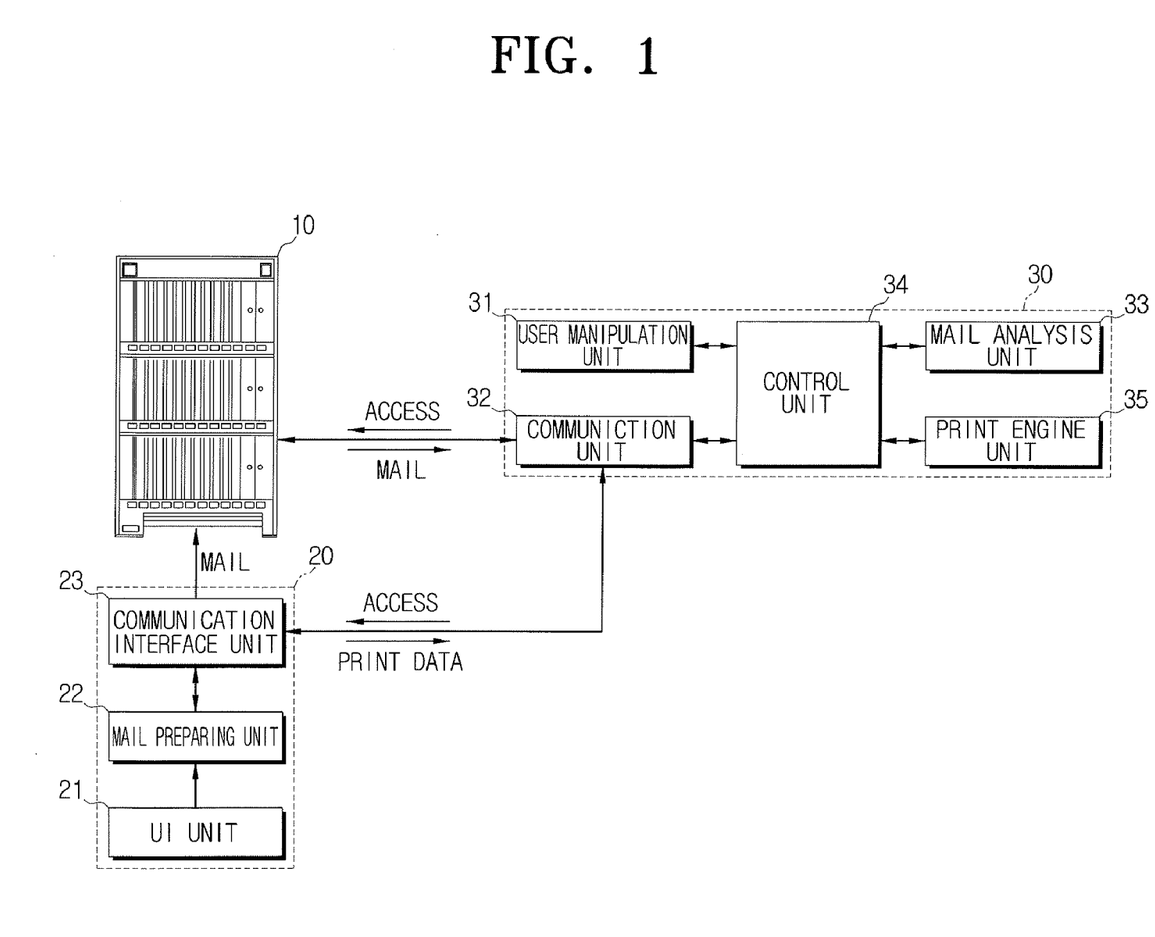
FIG. 1 is a view schematically illustrating a network printing system according to an embodiment of the present general inventive concept.

FIG. 1 is a view schematically illustrating a network printing system according to an embodiment of the present general inventive concept.

Referring to FIG. 1, a network printing system according to the present embodiment includes a mail server 10, a host 20, and an image forming device 30.

The mail server 10 is a server that provides an email service. The mail server 10 allocates a mail account to the image forming device 30, so that the image forming device 30 receives mails from external devices. The host 20 transmits a mail to be sent to the image forming device 30 to the mail server 10.

The host 20 prepares a mail to be sent to the image forming device 30 and transmits the prepared mail to the mail server 10. For this, the host 20 includes a user interface (UI) unit 21, a mail preparing unit 22, and a communication interface unit 23.

The UI unit 21 receives an input of channel information established for data communications and a mail account of the image forming device 30 allocated to the mail server. The UI unit 21 receives the channel information and the mail account through a menu such as a graphic user interface. The channel is generated by the host 20 for the data communications with the image forming device 30, and includes an Internet protocol (IP) of the host 20 and a communication port. The mail account includes an address to transmit for the mail server 10 and an email address of the image forming device 30. The address to transmit may be an address using a simple mail transfer protocol (SMTP).

The mail preparing unit 22 prepares a mail by using the mail account and the channel information input through the UI unit 210.

The communication interface unit 23 transmits the mail prepared by the mail preparing unit 22 to the mail server 10 that corresponds to the mail account. In addition, if the communication channel with the image forming device 30 is formed by an access attempt of the image forming device 30, the communication interface unit 23 transmits print data to the image forming device 30. A print file is composed of print data and a print option.

In addition, the image forming device 30 accesses the mail server 10 by using the mail account allocated to the mail server 10, and confirms the mail transmitted from the host 20. Then, the image forming device 30 accesses the host 20 through the channel included in the confirmed mail, and receives the print data from the host 20. For this, the image forming device 30 includes a user input unit 31, a communication unit 32, a mail analysis unit 33, a control unit 34, and a print engine unit 35.

The user input unit 31 receives an input of an address of the mail account required to confirm the mail transmitted from the host 20 to the mail server 10, i.e., the address of the mail server 10. The mail account required to confirm the mail, for example, may be the mail address using a post office protocol3 (POP3).

The communication unit 32 accesses the mail server 10 by using the input address, and receives the mail which has been transmitted from the host 20 to the mail account of the mail server 10 and stored in the mail server 10.

The mail analysis unit 33 receives the mail from the mail server 10 through the communication unit 32 if the mail exists in the mail account of the mail server 10. Then, the mail analysis unit 33 confirms the channel established to provide access to the host 20 by analyzing the transmitted mail.

The control unit 34 accesses the host 20 through the confirmed channel, and controls the communication unit 32 to receive the print data provided from the host 20.

The print engine unit 34 prints the print data received through the communication unit 32 on a printing medium such as paper.

Figure 2:
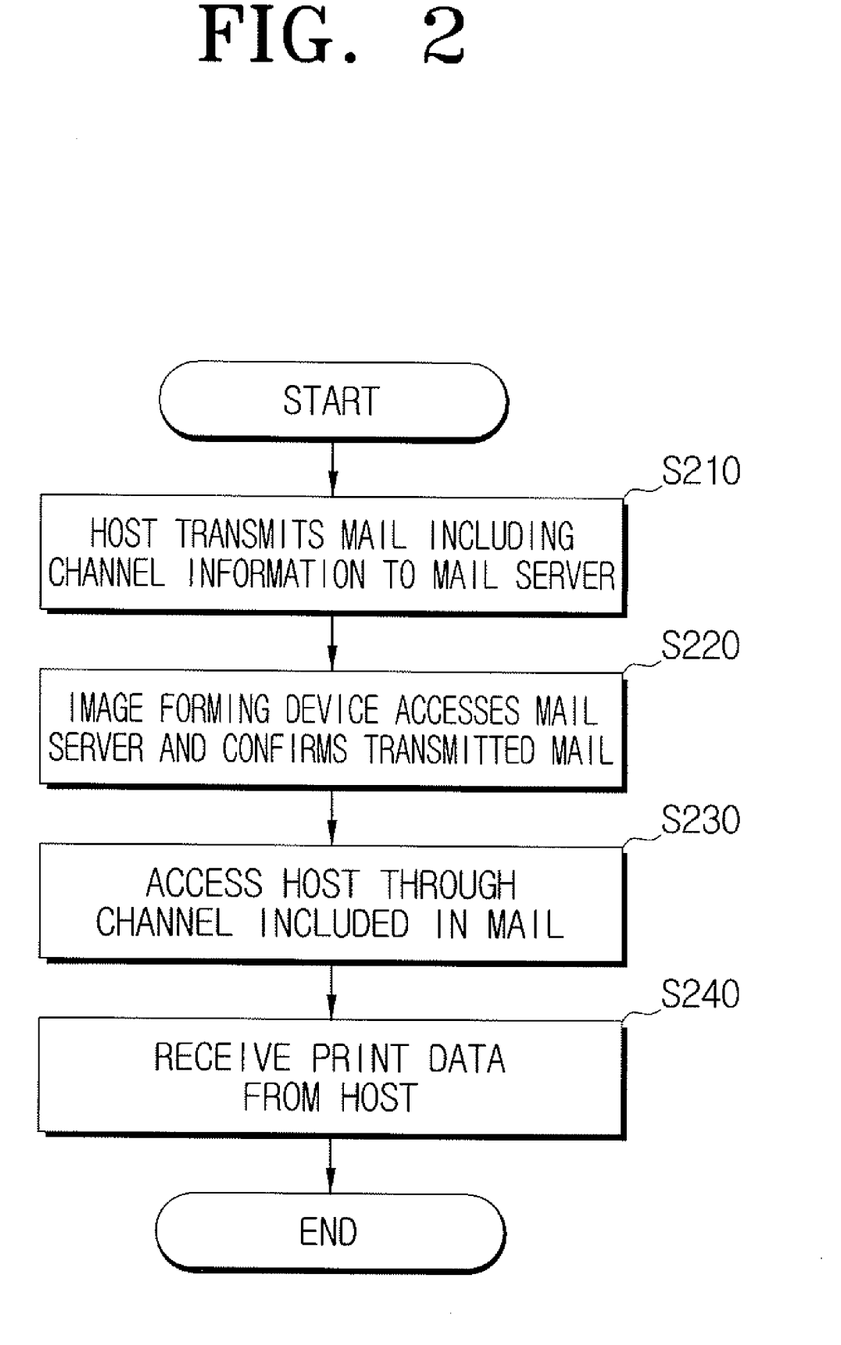
FIG. 2 is a flowchart illustrating a network communication method performed by a network printing system according to the embodiment as illustrated in FIG. 1.

FIG. 2 is a flowchart illustrating a network communication method performed by a network printing system according to the embodiment as illustrated in FIG. 1.

Referring to FIG. 2, the host 20 prepares and transmits a mail that includes channel information of the host to the mail server at operation (S21).

The image forming device accesses the mail server 10, and confirms whether the mail, which has been transmitted to the mail account allocated to the image forming device 30, exists at operation (S22).

If the mail exists as a result of confirming, the image forming device 30 accesses the host 20 through the channel included in the mail at operation (S23).

If the access is successful, the image forming device 30 receives and prints the print data from the host 20 at operation (S24).

Accordingly, even if the host 20 cannot directly transmit the print data to the image forming device 30 due to the firewall disposed in the host 20 and/or the image forming device 30, the image forming device 30 forms a communication channel by accessing the host 20. Accordingly, the user can print the print data stored in the host 20 through the image forming device 30.

Figure 3:
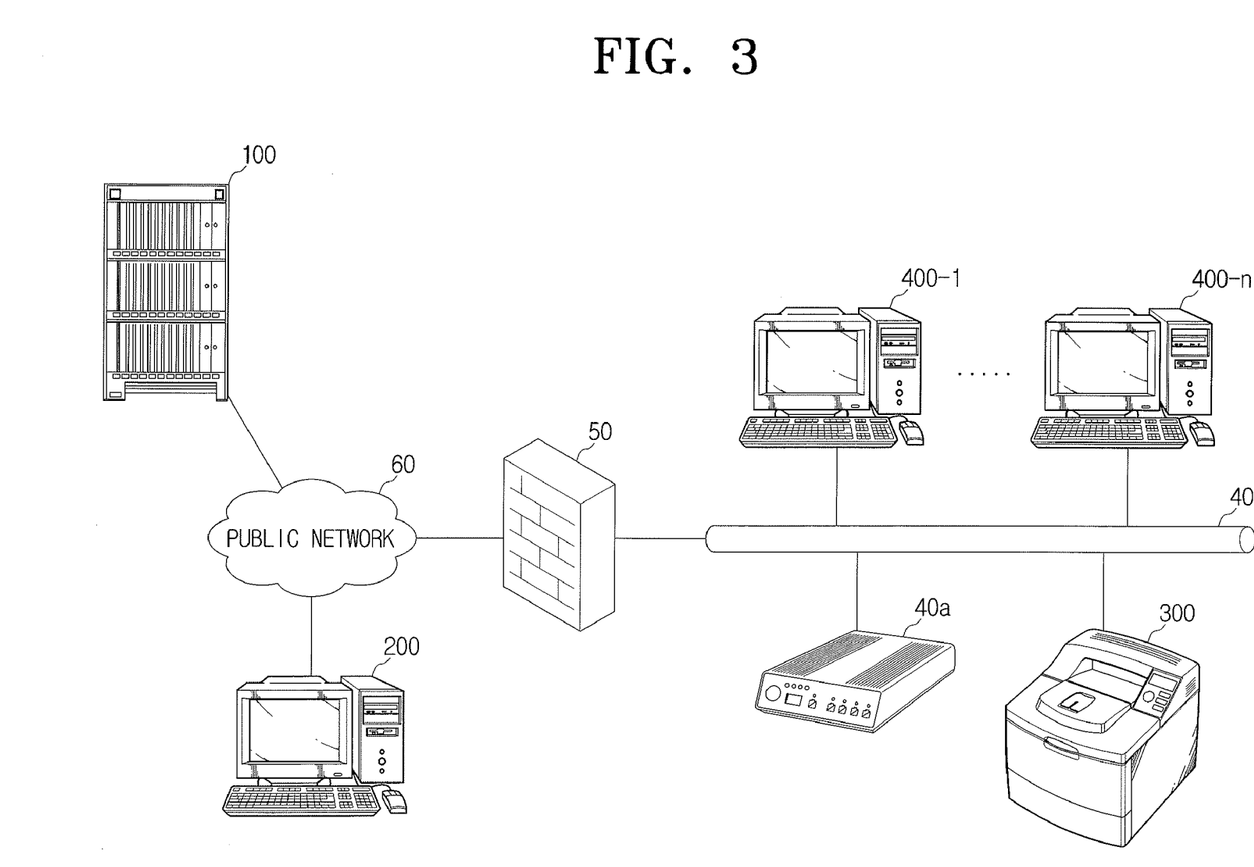
FIG. 3 a view schematically illustrating a network printing system according to an embodiment of the present general inventive concept.

FIG. 3 a view schematically illustrating a network printing system according to an embodiment of the present general inventive concept.

Referring to FIG. 3, the network printing system according to the present embodiment includes a mail server 100, a host 200, and an image forming device 300. The mail server 100 and the host 200 are provided in a public network that is an external network, and the image forming device 300 is provided in a private network that is an internal network.

The mail server 100 is a server that provides an email service. The mail server 100 serves as a server to receive mail with respect to the host 200, and serves as a server to transmit mail with respect to the image forming device 300. The server to receive mail may be an SMTP server, and the server to transmit mail may be a POP3 server. The mail server 100 allocates a mail account to receive a mail for the image forming device 300. The mail account allocated using POP3, i.e., the address required for the image forming device 300 to access the mail server 100, for example, may be in the form of "POP3.SAMSUNG.COM."

When the host 200 intends to transmit a mail to inform the image forming device 300 of the existence of data to be printed, the host 200 transmits the mail through the public network 60 to the mail server 100 that the image forming device 300 uses. The mail server 100 receives the mail transmitted from the host 200 through the SMTP server, and stores the mail in the POP3 server.

If the image forming device 300 accesses the POP3 server of the mail server 100 through the public network 60, the mail server 100 provides the stored mail to the image forming device 300. If the mail exists in the allocated mail account, the image forming device 300 loads the mail from the mail server 100.

Alternatively, the host 200 can be an external device located in the public network 60 that is an external network, and may be a terminal such as a personal computer that can store a document to be printed. For this, a printer driver related to the image forming device 300 is disposed in the host 200.

The host 200 transmits the mail to the mail server 100 through the mail account allocated to the image forming device 300. Then, if the image forming device 300 attempts to connect to the host 200 and a communication channel is formed between them, the host 200 transmits a print file to the image forming device 300 through the communication channel. The print file includes print data of the document, print options, and a security code.

The image forming device 300 is a device communicably connected with a plurality of devices 400-1 to 400-*n* through the private network 40, that is, the internal network. The information forming device 300 may be a printer, a multi-function device, a facsimile, or the like, disposed in an office. The private network 40 can be constructed using a gateway 40*a* and a LAN. In addition, the image forming device 300 forms a communicable path with the mail server 100 and the host 200 through the private network 40, the firewall 50, and the public network 60.

The firewall 50 prevents an external device from gaining access where access is not permitted, such as the host 200, from invading the private network 40 through the public network 60. However, if the image forming device 300 attempts to connect with the host 200 and a communication channel with the host 200 is formed, the firewall 50 does not intercept the transmission of the print file transmitted from the host 200. That is, the host 200 transmits the print file including the print data to be printed to the image forming device 300 through the firewall 50.

Accordingly, the image forming device 300 accesses the mail account allocated to the image forming device 300 through the public network 60, and if the mail exists in the mail account, it accesses the host 200 through the channel included in the mail. If the communication channel is formed through the access to the host 200, the image forming device 300 receives the print file from the host 200, and prints the print data included in the print file.

Figure 4:
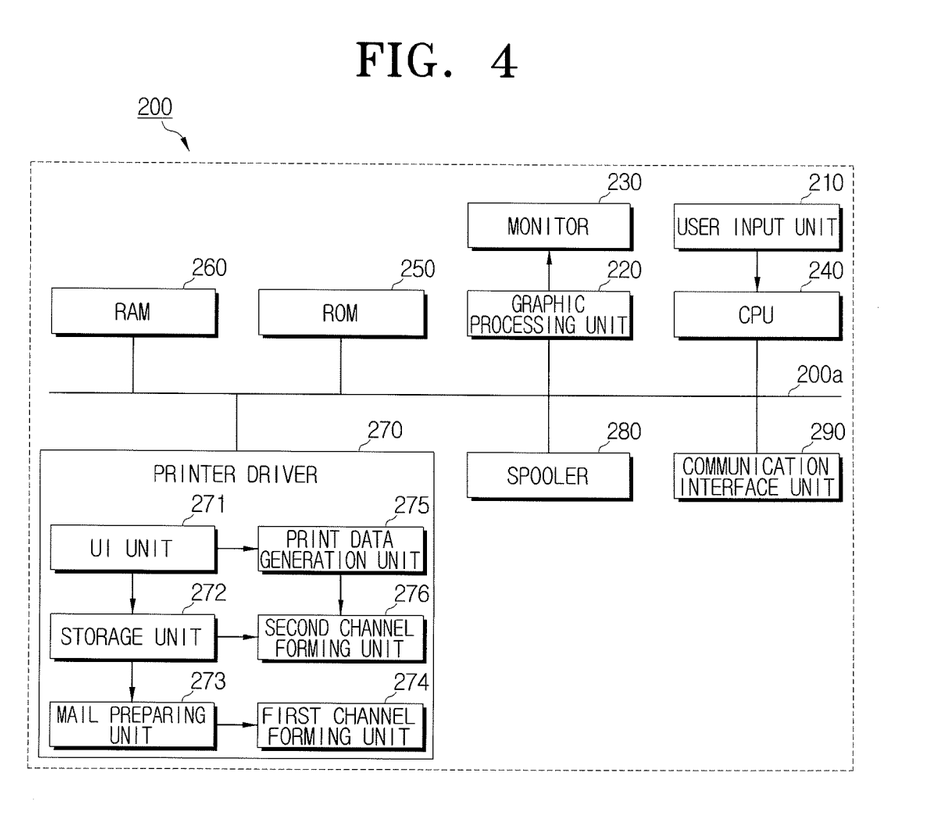
FIG. 4 is a block diagram illustrating a detailed construction of a host as illustrated in FIG. 3 according to the embodiment as illustrated in FIG. 3.

FIG. 4 is a block diagram illustrating a detailed construction of a host as illustrated in FIG. 3.

Referring to FIGS. 3 and 4, the host 200 includes a user input unit 210, a graphic processing unit 220, a display unit 230, a central processing unit (CPU) 240, a ROM 250, a RAM 260, a printer driver 270, a spooler 280, and a communication interface unit 290. A bus 200a is a data transmission path among the respective blocks as described above.

The user input unit 210 is a user interface to request functions supported by the host 200, and may be a keyboard, a mouse, a touch panel, or the like. The user inputs information on the mail account allocated to the image forming device 300 and a channel established by the host 200 for the data communications. Also, the user requests the printing of the stored print data by manipulating the user input unit 210.

The graphic processing unit 220 processes a general video signal as a displayable signal and outputs the processed video signal to the display unit 230. In particular, the graphic processing unit 220 generates a menu required for a mail preparation that is provided from the printer driver 270, and outputs the menu to the display unit 230.

The display unit 230 is a monitor implemented by a display panel such as a cathode ray tube (CRT), a liquid crystal display (LCD), or the like, and displays the menu required for the mail preparation that is provided from the graphic processing unit 220, an operation state of the host 200, or the like.

The CPU 240 manages the entire operation of the host by using various types of control programs stored therein. In particular, if the display of the menu required for the mail preparation is requested or the printing of the document is requested through the user input unit 210, the CPU 240 executes a printer driver program related to the printing operation.

The ROM 250 stores programs that are loaded from the ROM 240 and are to be executed by the CPU 240, data processed by the CPU 240, or the like.

In the case of printing a document prepared by an application program, the printer driver 270 converts the document into printable print data. In this case, the user sets print options required for the printing through functions provided by the printer driver 270 or the application program. The print option includes diverse options such as a range of printing, the number of copies, resolution, or the like. If the mail preparation is requested through the user input unit 210, the printer driver 270 generates the menu required for the mail preparation.

The spooler 280 performs a spooling of the print data generated by the printer driver 270 and the print options.

The communication interface unit 290 transmits the mail generated by the mail preparing unit 273 to the mail server 100 through the channel formed by a first channel forming unit 274. In addition, the communication interface unit 290 transmits the spooled print data and the print options to the image forming device 300 through the communication channel formed in advance by the image forming device 300. Accordingly, the mail is transmitted to the mail server 100 through the communication interface unit 290 and the public network 60, and the print data and the print options are transmitted to the image forming device 300 through the communication interface unit 290, the public network 60, the firewall 50, and the private network 40.

The communication interface unit 290 is provided with a plurality of ports, and at least one of the ports is connected to the image forming device 300. The ports include a port to which a network interface card is connected, a universal serial bus (USB) port, or the like.

Now, the printer driver 270 as illustrated in FIG. 4 will be described in more detail.

The printer driver 270 includes a UI unit 271, a storage unit 272, a mail preparing unit 273, a first channel forming unit 274, a print data generation unit 275, and a second channel forming unit 276.

Figure 5:
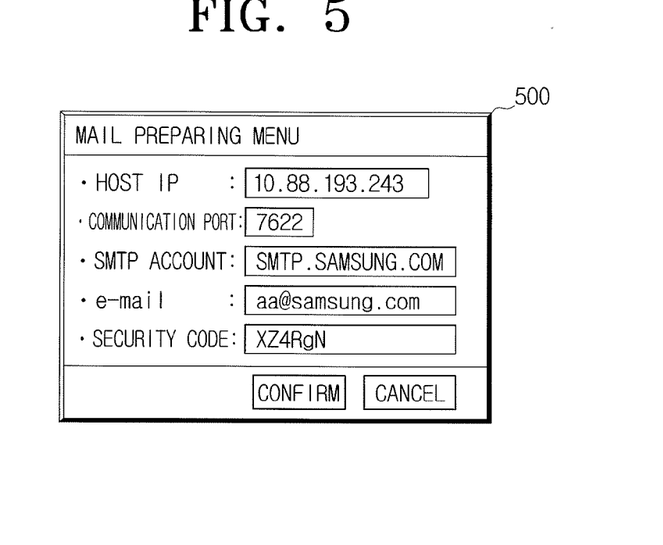
FIG. 5 is a view illustrating an example of a graphic user interface menu generated by a user interface unit according to the embodiment as illustrated in FIG. 3.

If the display of the menu required for the mail preparation is requested through the user input unit 210, the UI unit 271 generates a graphic user interface (GUI) menu 500 as illustrated in FIG. 5, and receives an input of the channel information, the mail account, and the security code through the generated GUI menu 500.

Referring to FIG. 1, the channel is generated by the host 20 for the data communications with the image forming device 30, and includes the Internet protocol (IP) of the host 20 and communication ports. Referring to FIG. 4 and 5, the IP of the host 200 may be directly confirmed and input by the user through registration information of an icon called "network environment" provided by Windows, or may be automatically displayed on the GUI menu 500 after the printer driver 270 confirms the IP in association with the "network environment" of Windows. As the communication port, the user can select one among numbers "0~65000."

Referring to FIGS. 1 and 3, the mail account includes an SMTP account address of the mail server 10 and the email address of the image forming device 30. The security code is a code for authentication between the host 200 and the image forming device 300, and the image forming device 300 attempts to access the host 200 where the security code stored in the host 200 coincides with the security code stored in the image forming device 300.

Accordingly, if the GUI menu is displayed on the display unit 230, the user inputs the IP allocated to the host 200, the communication port, the SMTP account address (i.e., the address for the mail transmission) of the image forming device 300, the email address of the image forming device 300, and the security code, by manipulating the user input unit 210, and then selects "confirm." As illustrated in FIG. 5, an example of the IP is "10.88.193.243," an example of the communication port "7622," an example of the SMTP account address "SMTP.SAMSUNG.COM," an example of the email address aa@samsung.com, and an example of the security code "XZ4RgN," respectively.

Referring to FIG. 5, if the "confirm" is selected after the information required to form the mail account and the communication channel is input, the mail account, the communication channel information, and the security code input to the GUI menu 500 are mapped on the image forming device 300, and then stored in the storage unit 272.

The mail preparing unit 273 prepares the mail by using the channel information and the security code input through the UI unit 271. Specifically, if the printing of the document is requested through the user input unit 210, the mail preparing unit 273 prepares a mail of a specified form as illustrated in FIG. 6, using the channel information and the security code stored in the storage unit 272.

Figure 6:
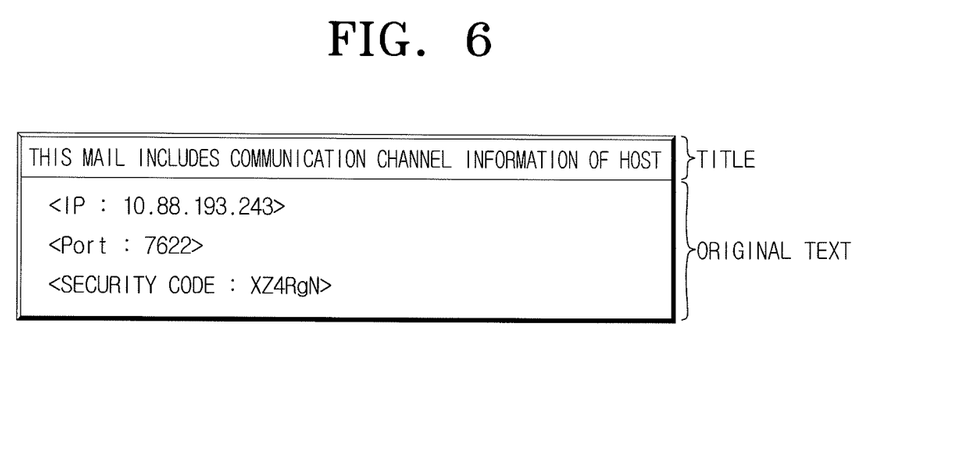
FIG. 6 is a schematic view illustrating a form of a mail prepared by a mail preparing unit as illustrated in FIG. 4.

Referring to FIG. 6, a form of the mail is briefly divided into a title of mail and an original text having a syntax form. The title of mail may be determined as "This mail includes communication channel information of a host," and the original text includes the communication channel information of the host 200 input through the menu 500 as illustrated in FIG. 5, i.e., the IP, the communication port, and the security code.

Referring to FIGS. 2 and 4, if the printing of the document is requested through the user input unit 210, the first channel forming unit 274 forms a channel communicable with the mail server 100. The communication interface unit 290 accesses the SMTP server of the mail server 100 through the channel formed by the first channel forming unit 274, and then transmits the mail to the SMTP server of the mail server 100 by using the SMTP.

The print data generation unit 275 converts the document to be printed into print data in a form that can be recognized by the image forming device 300. If the image forming device 300 accesses the host 200, the print data generation unit 275 attaches the security code to a printer job language (PJL), that is, the print option information, and then generates the print file by combining the print data with the PJL having the security code attached thereto. The print file is stored in the storage unit 272 or the RAM 260.

The second channel forming unit 276 forms a communication channel stored in the storage unit 272. The formed channel is a channel to transmit the print data to the image forming device 300. The communication interface unit 290 waits to access the image forming device 300 through the channel established through the second channel forming unit 276. If the image forming device 300 accesses the communication interface 290 through the established channel, the communication interface unit 290 transmits the stored print file to the image forming device 300 through the established channel.

Figure 7:
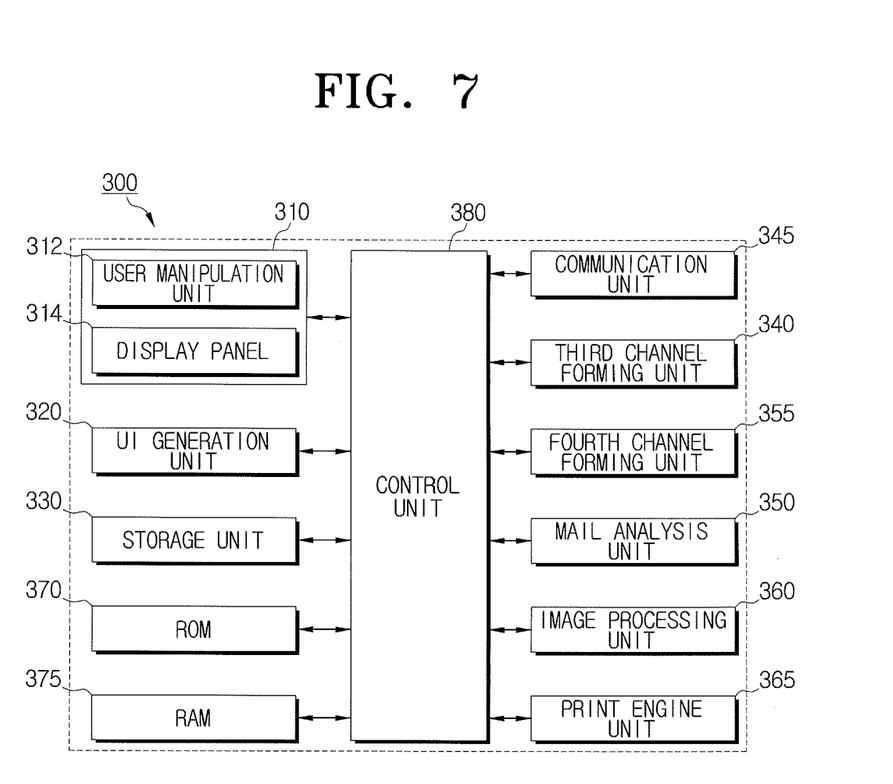
FIG. 7 is a block diagram schematically illustrating a construction of an image forming device as illustrated in FIG. 3.

FIG. 7 is a block diagram schematically illustrating a construction of an image forming device as illustrated in FIG. 3.

Referring to FIG. 7, the image forming device 300 includes an operation panel unit 310, a UI generation unit 320, a storage unit 330, a third channel forming unit 340, a communication unit 345, a mail analysis unit 350, a fourth channel forming unit 355, an image processing unit 360, a print engine unit 365, a ROM 370, a RAM 375, and a control unit 380.

The operation panel unit 310 includes a user manipulation unit 312 and a display panel 314 in order to support an interface between the user and the image forming device 300. The user manipulation unit 312 outputs a signal to select, manipulate, and request respective functions supported by the image forming device 300 to the control unit, and is provided with various types of function keys and a touch screen.

The display panel 314 displays the present state of the image forming device 300, attribute information of the file being currently printed, the UI generated by the UI generation unit 320, or the like, under the control of the control unit 380. The display panel 314 may be implemented by a liquid crystal display (LCD), a cathode ray tube (CRT), a plasma display panel (PDP), or the like.

If the GUI menu is displayed on the display panel 314, the user inputs the mail account of the image forming device 300, the security code, and an access period by manipulating the user manipulation unit 312, and then selects "confirm."

Referring to FIGS. 1 and 7, the mail account is an address to access the POP3 server of the mail server 100 to store the mail transmitted from the host 200. The security code is a code used to judge the authentication between the host 200 and the image forming device 300 and the suitability of the mail confirmed by the mail server 100. The access period is a period in which the image forming device 300 accesses the mail server 100. The access period has an initial value, and the user can select the time unit such as second/minute/hour and an access period value.

An example of the POP3 is "PAP3.SAMSUNG.COM," an example of the security code is "XZ4RgN," and an example of the access period is "10 minutes."

The storage unit 330 stores the mail account of the mail server 100, the security code, and the access period input through the displayed UI. The contents of the stored data can be edited through the UI.

The third channel forming unit 340 forms a channel communicable with the mail server 100 if the account address of the mail server 100, the security code, and the access period are stored in the storage unit 330. That is, the third channel forming unit 340 forms the channel required to access the POP3 server of the mail server 100 and to receive the mail from the POP3 server.

The communication unit 345 periodically accesses the mail server 100 through the address of the mail server 100 input through the UI and the channel formed by the third channel forming unit 340. Additionally, the communication unit 345 brings the mail, which is transmitted to the mail account of the image forming device 300 and stored in the POP3 server, using the POP3. The mail brought from the mail server 100 is input to the mail analysis unit 350 through the channel formed by the third channel forming unit 340.

The mail analysis unit 350 confirms whether the mail has a specified form including the syntax by analyzing the mail input from the communication unit 345. That is, the mail analysis unit 350 confirms whether the mail has the form prepared by mutual regulations between the host 200 and the image forming device 300.

If the mail has the specified form as a result of confirmation, the mail analysis unit 350 confirms whether the security code is included in the mail. If the security code is included in the mail, the mail analysis unit 350 judges whether the security code included in the mail coincides with the security code stored in the storage unit 330 by comparing the two security codes with each other. If the security codes coincide with each other, the mail analysis unit 350 judges that the mail has been transmitted from the host 200 of which the access is permitted. Then, the mail analysis unit 350 extracts the communication channel established by the host 200, i.e., the IP of the host 200 and the port information, by analyzing the original text of the mail.

Then, the mail analysis unit 350 outputs a signal to request a deletion of the mail stored in the mail server 100, i.e., the mail brought from the mail server, and the communication unit 345 transmits the deletion request signal to the mail server 100 through the channel formed by the third channel forming unit 340. Accordingly, the mail stored in the POP3 server of the mail server 100 is deleted.

The fourth channel forming unit 355 accesses the host 200 through the communication channel extracted by the mail analysis unit 350, and forms a channel to receive the print file from the host 200. If the channel for the communications with the host 200 is formed, the communication unit 345 first accesses the host 200 through the formed channel and the channel extracted from the mail. Here, the fact that the image forming device 300 first accesses the host 200, that is, the firewall 50 permits the access of the host 200.

Accordingly, the host 200 is permitted to access the image forming device 300 in a state that access to the image forming device 300 by the host 200 is not permitted by the firewall 50.

If the print file transmitted from the host 200 is input to the communication unit 345 through the channel formed by the fourth channel forming unit 355 after the access to the host 200, the control unit 380 confirms whether the security code included in the print options of the received print file coincides with the security coded stored in the storage unit 330. If the security codes coincide with each other, the control unit 380 outputs the print file to the image processing unit 360.

The image processing unit 360 converts the print data included in the print file into a format such as a bitmap, and converts its resolution into a value set in the print option, for example, a predetermined resolution.

The print engine unit 365 prints the print data processed by the image processing unit 360 according to the set print options. In order to perform the printing, the print engine unit 260 fuses the image onto the printing paper by heating and pressing the printing medium such as paper at a proper temperature.

The ROM 370 stores various types of control programs required to perform the functions of the image forming device 300 and a program required to confirm the specified format of the mail transmitted from the mail server 100.

The RAM 375 temporarily stores various types of data generated during the operation of the image forming device 300.

The control unit 380 controls the operation of the image forming device 300 by using a pre-stored control program, and controls the above-described operations. In particular, the control unit 380 controls the communication unit 345 to access the mail server 100 through the channel formed by the third channel forming unit 340 and to receive the mail from the mail server 100. Also, the control unit 380 controls the communication unit 345 to access the host 200 through the channel formed by the fourth channel forming unit 355 and the channel confirmed through the mail and to receive the print data provided from the host 200.

In addition, the control unit 380 compares the security coded included in the received print file with the security code stored in the storage unit 330, and if the security codes coincide with each other, the control unit 380 judges that the print file has been transmitted from the host 200 of which access is permitted.

If the printing is completed, the control unit 380 controls the fourth channel forming unit 355 to close the channel formed by the fourth channel forming unit 355.

Figure 8:
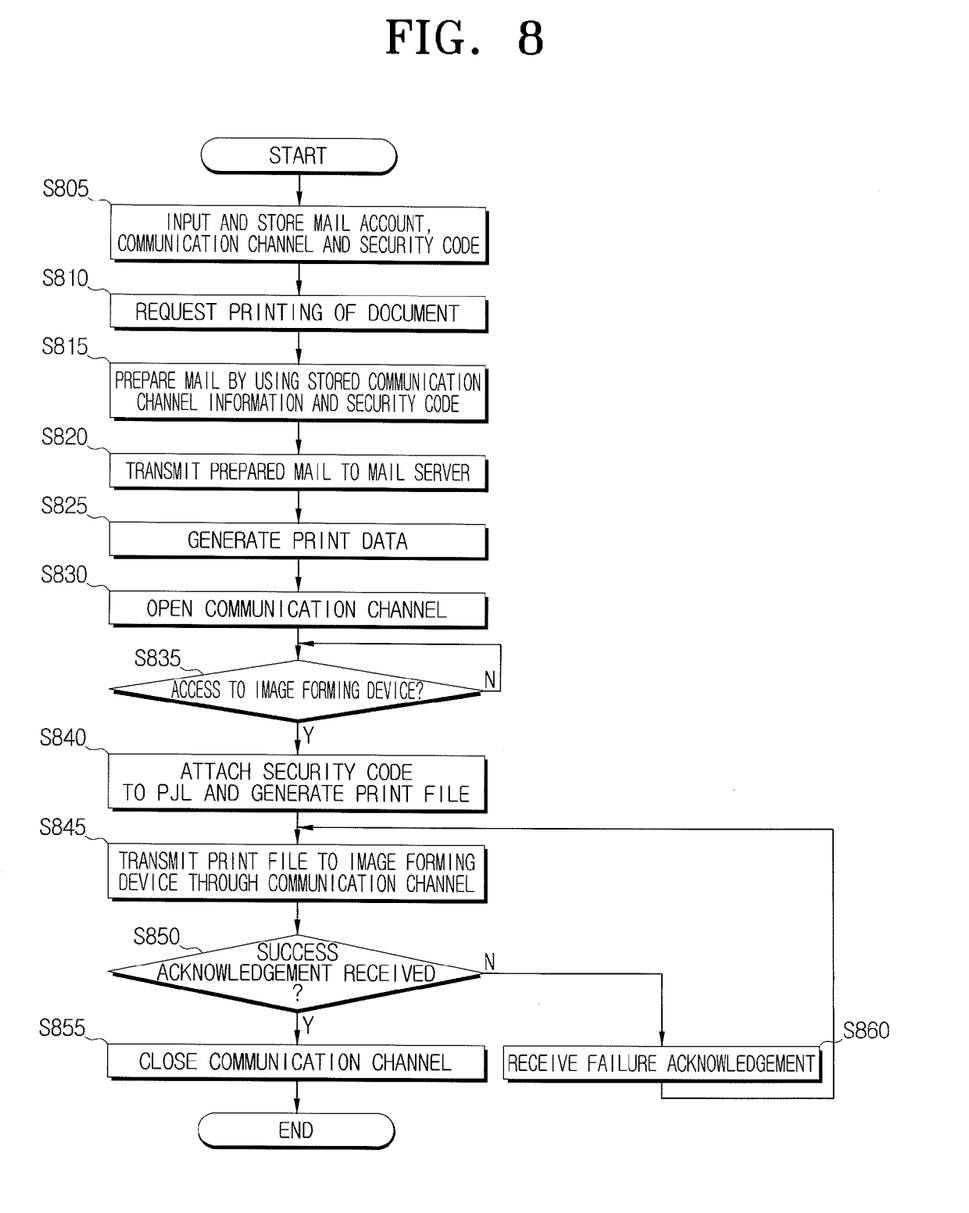
FIG. 8 is a flowchart illustrating a communication method in which a host as illustrated in FIG. 4 communicates with a mail server and an image forming device.

FIG. 8 is a flowchart illustrating a communication method in which a host as illustrated in FIG. 4 communicates with a mail server and an image forming device.

Referring to FIGS. 4 to 8, if the mail account, the communication channel, and the security code are input in the menu 500 displayed on the display unit 230 as illustrated in FIG. 5, the mail account, the communication channel, and the security code are stored in the storage unit 272 at operation (S805). The mail address is an address to which the mail is to be transmitted, and includes an SMTP account address and an email address of the image forming device 300. The communication channel is a channel created by the host 20 for the data communications with the image forming device 300, and includes the IP of the host 20 and the communication port. The security code is a code for the authentication between the host 200 and the image forming device 300.

If the printing of the document is requested through the user input unit 210 at operation (S810), the mail preparing unit 273 prepares the mail by using the channel information and the security code stored in the storage unit 272 at operation (S815). The prepared mail has a specified form set by mutual regulations between the host 200 and the image forming device 300 as illustrated in FIG. 6. That is, the form of the mail is briefly divided into the title of mail and the original text having a syntax form.

After operation (S815), the communication interface unit 290 accesses the mail server 100 through the mail account stored in the storage unit 272 and the channel communicable with the mail server 100 that is formed by the first channel forming unit 274, and transmits the prepared mail to the mail server 100 at operation (S820). Specifically, where the mail server 100 is a server that uses SMTP/POP3, the communication interface unit 290 transmits the prepared mail to the SMTP server of the mail server 100.

The print data generation unit 275 converts the document to be printed into print data in a form that can be recognized by the image forming device 300 at operation (S825).

Then, the communication interface unit 290 waits for access to the image forming device 300 by establishing the channel formed by the second channel forming unit 276, i.e., the communication channel stored in the storage unit 272 at operation (S830).

If the image forming device 300 accesses the communication interface unit 290 through the established channel, i.e., the channel that is included in the mail transmitted to the mail server 100 at operation (S835), the print data generation unit 275 attaches the security code stored in the storage unit 272 to the printer job language (PJL), that is, the print option information, and then generates the print file by combining the print data with the PJL having the security code attached thereto.

If the operation (S840) is performed, the communication interface unit 290 transmits the generated print file to the image forming device 300 through the established channel at operation (S845). At the operation (S845), the print file is transmitted to the image forming device 300 through the communication interface unit 290, the public network 60, the firewall 50, and the private network 40.

After the operation (S845), if an acknowledgement is received, that is, the print file has been successfully received, from the image forming device 300 at operation (S850), the second channel forming unit 276 closes the established channel at operation (S855). The acknowledgement is generated from the control unit 380 or the communication unit 345 of the image forming device 300.

By contrast, if the received acknowledgement is a failure acknowledgement that indicates the failure of reception of the print file at operation (S860), the communication interface unit 290 proceeds to the operation (S845).

Accordingly, the host 200 transmits a mail indicating the existence of the file to be printed to the mail account allocated to the image forming device 300, and if access to the image forming device 300 is made, the host 200 can transmit the file to be printed to the image forming device 300 with no interception by the firewall 50.

Figure 9:
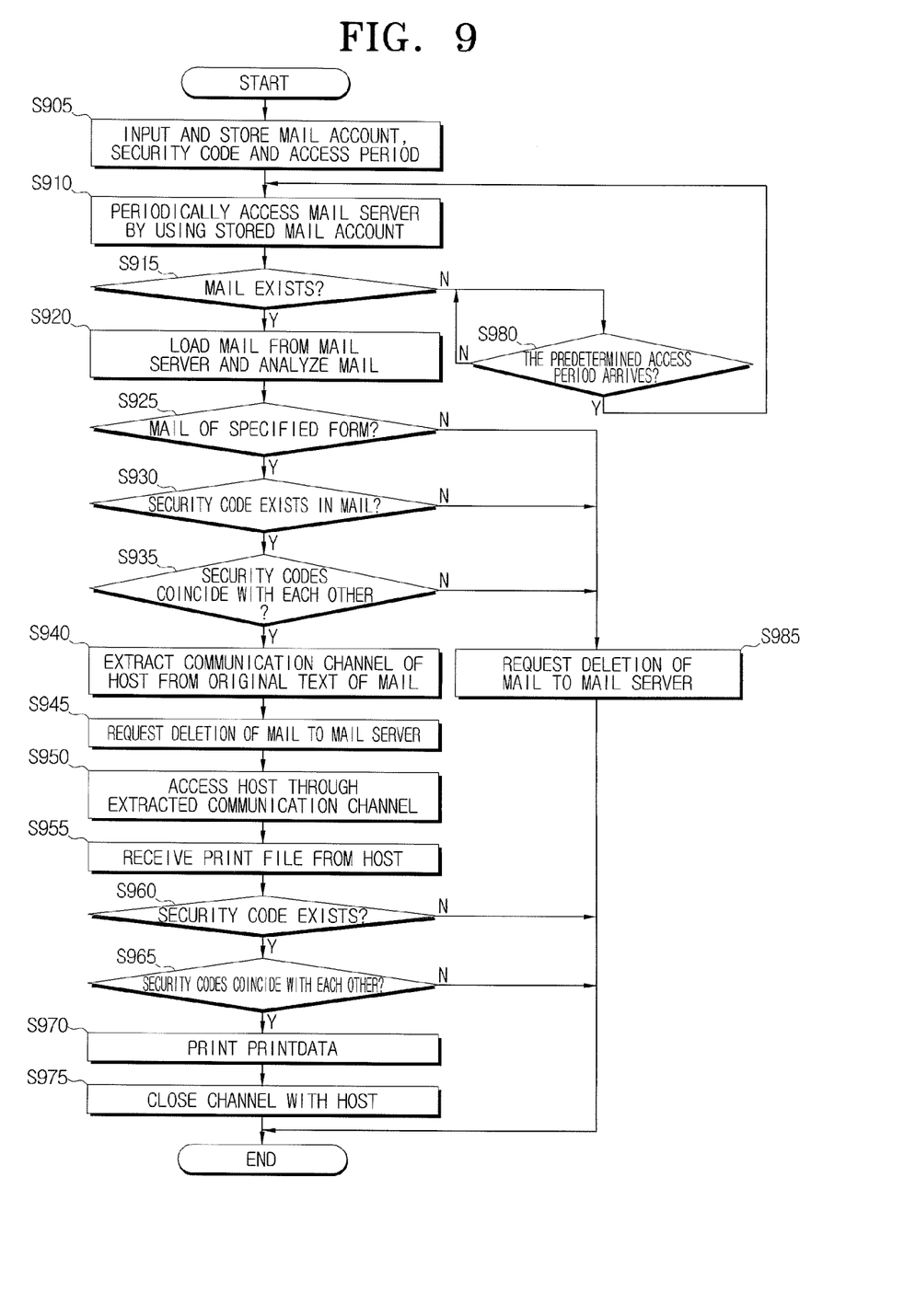
FIG. 9 is a flowchart illustrating a communication method in which an image forming device as illustrated in FIG. 4 communicates with a mail server and an image forming device.

FIG. 9 is a flowchart illustrating a communication method in which an image forming device as illustrated in FIG. 4 communicates with a mail server and an image forming device.

Referring to FIGS. 4 to 9, if the mail account, the security code, and the access period are input through the UI displayed on the display panel 314, and are stored in the storage unit 330 at operation (S905). The mail address is an address required for the image forming device 300 to confirm the mail transmitted from the host 200, and corresponds to the POP3 address. The security code is a code is a code for the authentication between the host 200 and the image forming device 300, and the access period is a period in which the image forming device 300 accesses the mail server 100.

If the operation (S905) is performed, the communication unit 345 periodically accesses the mail server 100 through the mail account stored at operation (S905) and the channel formed by the third channel forming unit 340 at operation (S910). The communication unit 345 accesses the mail server 100 for each access period stored at the operation (S905).

If a mail, which has been transmitted to the email address of the image forming device 300, exists in the mail server 100, the communication unit 345 loads the mail from the mail server 100, and the mail analysis unit 350 analyzes the loaded mail at operation (S920). Here, the existence/nonexistence of the mail is confirmed by the image forming device 300 in accordance with the mail server's response to the command to ask for the existence/nonexistence of the mail.

If the loaded mail is a mail of a specified form according to mutual regulations between the host 200 and the image forming device 300 at operation (S925), the mail analysis unit 350 confirms whether the security code exists in the original text of the mail at operation (S930).

If the security code exists as a result of confirmation, the mail analysis unit 350 confirms whether the security code included in the mail coincides with the security code stored in the storage unit 330 at operation (S935).

If the security codes coincide with each other as a result of confirmation, the mail analysis unit 350 extracts information of the communication channel established by the host from the original text of the loaded mail at operation (S940).

If the operation (S940) is performed, the mail analysis unit 350 outputs a signal to request the deletion of the mail brought from the mail server 100, and the communication unit 345 transmits the deletion request signal to the mail server 100 through the channel formed by the third channel forming unit 340 at operation (S945). Accordingly, the mail stored in the POP3 server of the mail server 100 is deleted.

Also, the communication unit 345 accesses the host 200 through the extracted communication channel at operation (S950). As the communication unit 345 accesses the host 200 through the communication channel that has been established by the host 200, the host 200 can transmit the print file to the image forming device 300 through the firewall 50.

After the operation (S950), if the print file that includes the print data is received from the host 200 at operation (S955), the control unit 380 confirms whether the security code exists in the received print file at operation (S960). If it is confirmed that the security code exists in the received file, the control unit 380 confirms whether the confirmed security code coincides with the security code stored in the storage unit 330 at operation (S965).

If the security codes coincide with each other as a result of confirmation at operation (S965), the print engine unit 365 prints the print data included in the received print file at operation (S970).

If the operation (S970) is performed, the control unit 380 controls the communication unit 345 to close the communication channel connected to the host 200 at operation (S975).

By contrast, if no mail exists at operation (S915), the control unit 380 controls the communication unit 345 to access the mail server 100 when the predetermined access period arrives at operation (S980).

In addition, if it is confirmed that the mail does not have the specified form at operation (S925), or if it is confirmed that the security code does not exist in the mail at operation (S930) or the security codes do not coincide with each other at operation (S935), the mail analysis unit 350 outputs a signal to request the deletion of the mail brought from the mail server 100, and the communication unit 345 transmits the deletion request signal to the mail server 100 at operation (S985). Accordingly, the mail stored in the POP3 server of the mail server 100 is deleted.

As described above, according to the network printing system, the network communication method to print information, the host and the image forming device to perform network communications according to various embodiments of the present general inventive concept, the host located in the public network can use the image forming device located in the private network having the firewall disposed therein, even without a network manager's intervention, and thus a user's convenience is improved.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A network printing system, comprising:
a mail server to provide a mail transmitting/receiving service;
an image forming device to access a mail account allocated to the mail server and receive a mail transmitted to the mail account; and
a host to transmit to the mail server a mail including channel information corresponding to a channel established for the host to communicate directly with the image forming device, the channel information including an Internet protocol (IP) address and a communication port of the host, wherein the image forming device attempts to access the host by using the channel information included in the received mail,
wherein the host transmits a print data through the channel formed in advance by the image forming device's accessing the host,
wherein the image forming device is connected to an internal network, the mail server and the host are connected to an external network, and access to the internal network from the external network is restricted by a firewall.

2. The network printing system of claim 1, wherein the host comprises:
a user interface unit to receive an input of the mail account to transmit the mail and receive an input of the channel information of the host;
a mail preparing unit to prepare the mail by using the input mail information and the channel information; and
a communication interface unit to transmit the prepared mail to the mail server.

3. The network printing system of claim 1, wherein the host includes a security code in the mail and transmits the mail with the security code to the mail server.

4. The network printing system of claim 1, wherein the image forming device comprises:
a user manipulation unit to receive an input of an address of the mail server required to receive the mail;
a communication unit to access the mail server by using the input address;
a mail analysis unit to confirm a channel to provide access to the host, included in the mail if the mail exists in the mail account of the accessed mail server;
a control unit to control the communication unit to receive print data by accessing the host through the confirmed channel; and a print engine unit to print the print data received through the communication unit.

5. The network printing system of claim 4, further comprising:
a storage unit to store a security code of a predetermined form;
wherein if the security code of the predetermine form exists in the mail, the mail analysis unit confirms whether the security code existing in the mail coincides with the security code stored in the storage unit, and if the security code existing in the mail coincides with the security code stored in the storage unit, confirming the channel information by analyzing the mail.

6. The network printing system of claim 1, wherein the image forming device comprises:
a communication unit to receive the print data from the host by using the channel confirmed through the channel information;
a mail analysis unit to confirm whether a security code exists in the received print data, and if the security code exists, confirming whether the security code existing in the print data coincides with a security code stored in the image forming device; and
a print engine unit to print the print data if the security code existing in the print data coincides with the security code stored in the image forming device.

7. The network printing system of claim 1, wherein the host is located in a public network that is an external network, and the image forming device is located in a private network that is an internal network including a firewall.

8. A network communication method to print information, the network communication method comprising:
transmitting by a host a mail including channel information corresponding to a channel established for the host to communicate directly with the image forming device, to a mail server allocated with a mail account of an image forming device, the channel information including an Internet protocol (IP) address and a communication port of the host;
receiving by the image forming device the mail transmitted to the mail account and attempting to access the host by using the channel information included in the received mail;
transmitting by the host print data to the image forming device through the channel formed in advance by the image forming device's accessing the host; and
printing by the image forming device the transmitted print data,
wherein the image forming device is connected to an internal network, the mail server and the host are connected to an external network, and access to the internal network from the external network is restricted by a firewall.

9. The network communication method of claim 8, wherein the transmitting of the mail comprises:
receiving an input of the mail account to transmit the mail and the channel information of the host;
preparing the mail by using the input mail account and the channel information; and
transmitting the prepared mail to the mail server that corresponds to the input mail account.

10. The network communication method of claim 8, wherein the mail that is transmitted to the mail server includes a security code input from the host.

11. The network communication method of claim 8, wherein the accessing of the host comprises:
inputting an address of the mail server required to receive the mail;
accessing the mail server by using the input address;
confirming a channel established to provide access to the host, included in the mail if the mail exists in the mail account of the accessed mail server; and
accessing the host through the confirmed channel.

12. The network communication method of claim 11, wherein the confirming of the mail comprises:
confirming whether a security code exists in the mail if the mail exists in the mail account;
confirming whether a security code stored in the image forming device coincides with the security code existing in the mail if the security code exists in the mail; and
confirming the channel by analyzing the mail if the security codes coincide with each other.

13. The network communication method of claim 12, wherein the confirming of the mail further comprises:
deleting the mail stored in the mail server if the security codes coincide with each other.

14. The network communication method of claim 8, wherein the printing of the print data comprises:
receiving the print data from the host through the channel;
confirming whether a security code exists in the received print data; and
if the security code exists in the print data, printing the print data where the security code existing in the print data coincides with a security code stored in the image forming device.

15. The network communication method of claim 8, wherein the host is located in a public network that is an external network, and the image forming device is located in a private network that is an internal network including a firewall.

16. A host to perform network communications, the host comprising:
a user interface unit to receive an input of channel information corresponding to a channel established for the host to communicate directly with the image forming device and a mail account of the image forming device allocated to a mail server, the channel information including an internet protocol (IP) address and a communication port of the host;
a mail preparing unit to prepare the mail by using the input mail account and the input channel information; and
a communication interface unit to transmit the prepared mail to the mail server that corresponds to the input mail account, and transmit the print data to the image forming device though the channel when the channel with the image forming device is formed in advance by the image forming device's accessing the host,
wherein the image forming device is connected to an internal network, the mail server and the host are connected to an external network, and access to the internal network from the external network is restricted by a firewall.

17. The host of claim 16, wherein the image forming device accesses the mail account allocated to the mail server to confirm the transmitted mail, accesses the host through the channel included in the confirmed mail, and receives and prints the print data from the accessed host.

18. An image forming device to perform network communications, the image forming device comprising:
- a user manipulation unit to receive an input of an address of a mail server required to confirm a mail transmitted from a host to the mail server;
- a communication unit to access the mail server by using the input address;
- a mail analysis unit to extract channel information, included in the mail, used to establish a channel for the host to communicate directly with the the image forming apparatus, when the mail exists in a mail account of the accessed mail server, the channel information including an Internet protocol (IP) address and a communication port of the host;
- a control unit to control the communication unit to attempt to access the host by using the extracted channel information included in the received mail, and to control the communication unit to receive print data through the channel formed in advance by the image forming device's accessing the host; and
- a print engine unit to print the print data received through the channel,
- wherein the image forming device is connected to an internal network, the mail server and the host are connected to an external network, and access to the internal network form the external network is restricted by a firewall.

19. The image forming device of claim 18, wherein the host prepares and transmits the mail that includes the channel to the mail server that provides a mail transmitting/receiving service, and transmits the print data to the host if the communication channel with the host is formed.

20. A network communication method to print information, the network communication method comprising:
- accessing by an image forming device through a firewall on a private network an email server located on a public network;
- retrieving by the image forming device an email including a print request message including an internet protocol (IP) address, a port number, and a security code;
- matching by the image forming device the security code to a predetermined security code;
- establishing by the image forming device a connection with a host on the public network through the firewall using the IP address and port number of the host;
- receiving by the image forming device print data through the firewall; and
- performing by the image forming device a print operation on the print data.

* * * * *